G. STACKPOLE.
Combined Boot and Glove Buttoner.

No. 161,548.

Patented March 30, 1875.

Witnesses.
H. D. Blake
J. M. Swan

Inventor.
Greenleaf Stackpole

UNITED STATES PATENT OFFICE.

GREENLEAF STACKPOLE, OF ELIZABETH, ASSIGNOR TO GEORGANA D. COLLARD, OF MONT CLAIR, NEW JERSEY.

IMPROVEMENT IN COMBINED BOOT AND GLOVE BUTTONERS.

Specification forming part of Letters Patent No. 161,548, dated March 30, 1875; application filed March 25, 1875.

*To all whom it may concern:*

Be it known that I, GREENLEAF STACKPOLE, of the city of Elizabeth, in Union county and State of New Jersey, have invented a Combined Boot-Buttoner, Glove-Buttoner, Ear-Spoon, and Tweezers, of which the following is a specification:

The object of my invention is to combine the above-named articles to make a neat and convenient arrangement to be carried in the pocket, as will be fully understood by references to the accompanying drawings, in which—

Figure 1:
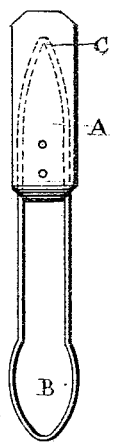
Figure 2:
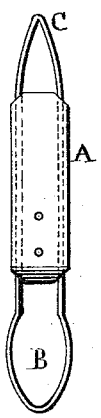
Figure 3:

Figure 1 is a side view of my device, showing it as a boot-buttoner, B, and tweezers A. Fig. 2 is a side view of my device, showing it as an ear-spoon and glove-buttoner, C. Fig. 3 is an edge view of my device.

The tweezer slides upon the wire frame, which is boot-buttoner, glove-buttoner, and ear-spoon, the broad end B being used as the boot-buttoner, and the narrow end C the ear-spoon and glove-buttoner, while the tweezers answer the double purpose of tweezers and handle to the other.

Having thus described my invention, what I claim as new, and desire to secure by Letters Patent, is—

As an article of manufacture, the implement herein described, consisting of the frame B C, which combines the boot-buttoner, glove-buttoner, and ear-spoon, having the movable tweezers thereon, and adapted for the purpose set forth.

G. STACKPOLE.

Witnesses:
H. D. BLAKE,
J. M. SNARE.